(12) United States Patent
Bleu-Laine et al.

(10) Patent No.: US 12,610,237 B1
(45) Date of Patent: Apr. 21, 2026

(54) TECHNIQUES FOR ENDPOINT CONNECTION WITHIN A NETWORK OF DEVICES

(71) Applicant: Amazon Technologies, Inc., Seattle, WA (US)

(72) Inventors: Gilles-Arnaud Bleu-Laine, San Ramon, CA (US); Tanuj Mohan, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 489 days.

(21) Appl. No.: 18/344,648

(22) Filed: Jun. 29, 2023

(51) Int. Cl.
| | |
|---|---|
| *H04M 1/66* | (2006.01) |
| *H04W 12/041* | (2021.01) |
| *H04W 12/0431* | (2021.01) |
| *H04W 12/069* | (2021.01) |

(52) U.S. Cl.
CPC ....... *H04W 12/069* (2021.01); *H04W 12/041* (2021.01); *H04W 12/0431* (2021.01)

(58) Field of Classification Search
CPC . H04W 12/065; H04W 12/08; H04W 12/069; H04W 12/0431; H04W 12/041
See application file for complete search history.

(56) References Cited

U.S. PATENT DOCUMENTS

| | | | |
|---|---|---|---|
| 7,193,644 | B2 | 3/2007 | Carter |
| 8,139,098 | B2 | 3/2012 | Carter |
| 8,144,183 | B2 | 3/2012 | Carter |
| 8,154,581 | B2 | 4/2012 | Carter |
| 8,780,201 | B1 | 7/2014 | Scalisi et al. |
| 8,823,795 | B1 | 9/2014 | Scalisi et al. |
| 8,842,180 | B1 | 9/2014 | Kasmir et al. |
| 8,872,915 | B1 | 10/2014 | Scalisi et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,058,738 | B1 | 6/2015 | Scalisi |
| 9,060,103 | B2 | 6/2015 | Scalisi |
| 9,060,104 | B2 | 6/2015 | Scalisi |

(Continued)

*Primary Examiner* — Shantell L Heiber
(74) *Attorney, Agent, or Firm* — Eversheds Sutherland (US) LLP

(57) ABSTRACT

Described herein are techniques for establishing a communication session between an endpoint device and a network. In embodiments, such techniques may comprise transmitting, by the endpoint device using a first communication protocol, a request to connect to a network. The endpoint device may then receive, from a network device, a request to establish a communication session using a second communication protocol. The techniques may further comprise authenticating, by the endpoint device, the network device as being associated with the network, and upon authenticating the network device, selecting, by the endpoint device, a security protocol associated with the network. The techniques may then comprise generating, by the endpoint device using the security protocol, a secure data packet, and transmitting, by the endpoint device to the network device, the secure data packet using the second communication protocol.

20 Claims, 6 Drawing Sheets

(56) References Cited

U.S. PATENT DOCUMENTS

| | | | |
|---|---|---|---|
| 9,065,987 | B2 | 6/2015 | Kasmir et al. |
| 9,094,584 | B2 | 7/2015 | Scalisi et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Kasmir et al. |
| 9,165,444 | B2 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi et al. |
| 9,179,108 | B1 | 11/2015 | Scalisi et al. |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,230,424 | B1 | 1/2016 | Scalisi et al. |
| 9,237,318 | B2 | 1/2016 | Kasmir et al. |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,508,239 | B1 | 11/2016 | Harrison et al. |
| 9,736,284 | B2 | 8/2017 | Scalisi et al. |
| 9,743,049 | B2 | 8/2017 | Scalisi et al. |
| 9,769,435 | B2 | 9/2017 | Scalisi et al. |
| 9,786,133 | B2 | 10/2017 | Harrison et al. |
| 9,799,183 | B2 | 10/2017 | Harrison et al. |
| 11,736,274 | B2 * | 8/2023 | Tsuji ..................... H04W 12/50 713/168 |
| 12,317,073 | B2 * | 5/2025 | Kim ...................... H04W 76/14 |
| 12,490,092 | B2 * | 12/2025 | Neipris ................ H04W 12/08 |
| 2020/0154272 | A1 * | 5/2020 | Uy ........................ H04W 12/08 |
| 2021/0075671 | A1 * | 3/2021 | Li ..................... H04W 12/0431 |
| 2023/0336983 | A1 * | 10/2023 | Bahal ................... H04W 12/06 |

* cited by examiner

SERVER 200

PROCESSORS
202

COMMUNICATION MODULE
204

MEMORY 224

SERVER APPLICATION
206

SOURCE IDENTIFYING
INFORMATION 208

IMAGE DATA 210

AUDIO DATA 212

MOTION DATA 214

ALERTS 216

NETWORK CONNECTIVITY
DATA 220

INPUT DATA 218

DEVICE SELECTION
MODULE 222

DEVICE DATA 224

600

TRANSMIT FIRST COMMUNICATION
602

RECEIVE REQUEST FROM NETWORK DEVICE
604

AUTHENTICATE NETWORK DEVICE IS ASSOCIATED
WITH NETWORK 606

SELECT SECURITY PROTOCOL ASSOCIATED WITH
NETWORK 608

GENERATE SECURE DATA PACKET USING SECURITY
PROTOCOL 610

TRANSMIT THE SECURE DATA PACKET TO THE
NETWORK DEVICE 612

TECHNIQUES FOR ENDPOINT CONNECTION WITHIN A NETWORK OF DEVICES

BACKGROUND

Systems are known in which devices having access to a wide area network (WAN) offer connectivity to local devices. For example, a gateway device may be configured to wirelessly receive a communication from an end node device, and send all or a portion of such communication to a remote system over a WAN such as the Internet. Similarly, a gateway device may be configured to receive a communication from a remote system, and wirelessly communicate it to an end node device. A remote system can even coordinate communications between multiple end node devices in such a manner.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
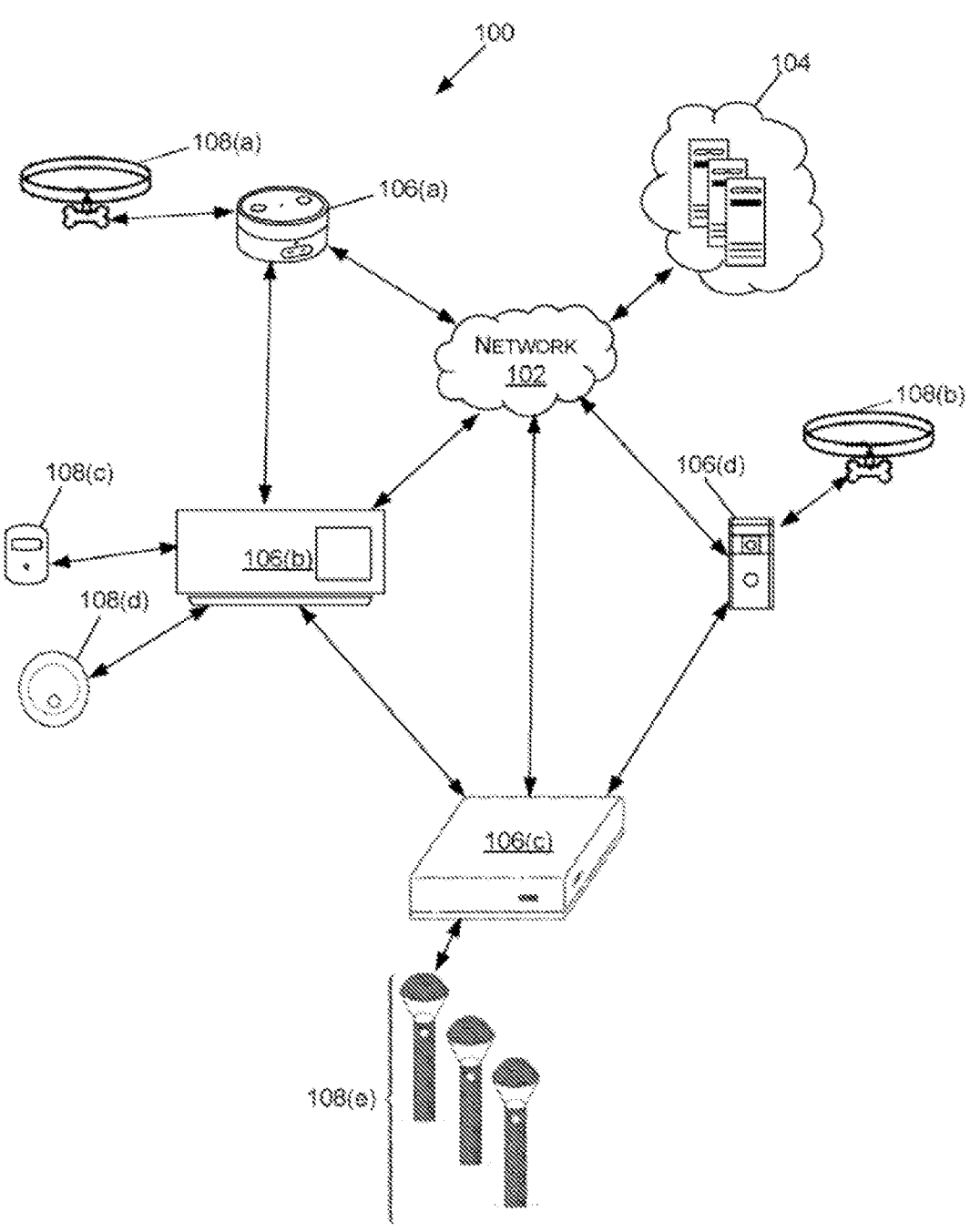
FIG. 1 is a diagram of an example system according to various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described herein are techniques for establishing a communication session between an endpoint device and a network. As noted elsewhere, the use of certain communication protocols may require initiation of a pairing process by a central device (e.g., a network device). Accordingly, it may be difficult for a peripheral device to establish communication with the central device using such communication protocols if no pairing process has been performed and the endpoint device is unable to initiate a pairing process. In some cases, the network device may not even be aware of the presence of the endpoint device. For example, an analytics device installed within a vehicle may need to upload analytics data to a server. In this example, when the vehicle approaches a network to which the analytics device wishes to connect, the network devices that manage the network may not be aware of the presence of the analytics device. Accordingly, the analytics device may be unable to establish a connection with the network until a user manually causes a network device to pair with the analytics device.

In embodiments of the system as described herein, an endpoint device is provided with the capability to initiate a pairing process in order to establish communication with a network device. To do this, the endpoint device may generate a beacon that is broadcast to network devices within wireless communication range of the endpoint device. The beacon, or at least a portion of the information included in that beacon, is then relayed to a server that identifies an appropriate network device to connect to the endpoint device. Instructions are provided to the identified network device to cause it to initiate a pairing process with the endpoint device.

In order to prevent a honey-pot attack, the endpoint device may authenticate any network device that attempts to establish a connection with it. In some cases, the network device provides a challenge response that includes a digital signature generated from a device identifier for the endpoint device and a private cryptographic key associated with the network. This digital signature can be verified in order to authenticate the network device is actually associated with the network to which the endpoint device is attempting to connect.

Embodiments of the disclosure provide for a number of advantages over conventional systems. For example, endpoint devices to be used with a network in conventional systems are often unable to initiate a pairing process in order to establish communication with the network absent user interaction. This can leave the endpoint device without any way to convey data that it has collected to an appropriate entity. Embodiments of the disclosure enable endpoint devices to prompt a network device to initiate a pairing process, allowing the endpoint device to establish communication with a network when it needs to do so, functionality that may not typically be available to such endpoint devices.

In accordance with one or more preferred implementations, endpoint devices that are part of a home security and monitoring system communicate with a network device that serves as a gateway for an endpoint device to communicate over a WAN. An endpoint device may be paired with and communicate with the network device using various modulation schemes and protocols (e.g., a frequency shift keying (FSK) scheme, a LoRa scheme, a Bluetooth Low Energy (BLE) scheme, etc.) distinct from a communication scheme or protocol used by a gateway device to communicate over a WAN (e.g., WiFi, ethernet, etc.).

Described herein is a system and techniques for implementing wireless networks configured to support long range communications and use with low-powered devices. In accordance with some implementations, a disclosed system enables network devices to better communicate over long ranges while minimizing power consumption. Disclosed systems are described with reference to the Figures below as well as within the attached Appendices (e.g., Appendix 1 and Appendix 2), which Appendices are hereby incorporated herein by reference in their entirety.

FIG. 1 is a diagram of an example system 100 that includes a network 102, one or more servers 104, network devices 106(*a*)-106(*d*), and endpoint devices 108(*a*)-108(*e*), including pet locating devices 108(*a*), 108(*b*), sensors (e.g., motion sensors, smoke detectors) 108(c), 108(d), and automation devices (e.g., lights, door locks, smart appliances) 108(e). In various embodiments, the network devices 106 may be any of a virtual assistant (VA) device (e.g., the network device 106(a)), a hub device of a security/alarm or home automation system (e.g., the network device 106(b)), a bridge device for extending range of a wireless network (e.g., the network device 106(c)), an audio/video recording and communication device (A/V device) such as a video doorbell (e.g., the network device 106(d)), etc.

The network devices 106 have the hardware and functionality to communicate with various endpoint devices (e.g., the endpoint devices 108), as well as communicate over the network 102. Each of the endpoint devices 108 are paired with one or more of the network devices 106 so that the endpoint devices 108 may be communicated with via the network devices 106. For example, the network devices 106 may have the hardware and functionality to communicate with the server(s) 104 over the network 102 by communicating with a WiFi network within a home, and the network devices 106 may also have the hardware and functionality to communicate with the endpoint devices 108 over a different wireless protocol, such as a 900 megahertz (MHz) band of channels. The endpoint devices 108 may not be capable of communicating directly over the WiFi network, so their communications pass through the respective network devices 106 to which the endpoint devices 108 are paired or associated.

In various embodiments, other wireless protocols may be used for the network devices 106 to communicate over the network 102 and/or with one another. In various embodiments, the network devices 106 may also communicate with the network 102 and/or with one another over wired connections, such as through an Ethernet cable connecting one or more of the network devices 106 to a wired or wireless router in connection with the network 102. The network devices 106 may also communicate with the network 102 and/or with one another over a combination of wired and wireless network components. In various embodiments, other wireless protocols and/or wired connections may also be used for communication between the network devices 106 and the endpoint devices 108. In various embodiments, the network devices 106 may communicate with one another over the same wireless protocol (e.g., a 900 MHz band of channels) that is used to communicate with the endpoint devices 108. Accordingly, the network devices 106 have multiple communication interfaces for communicating over the network 102 and with the endpoint devices 108. Other wireless or wired communication protocols that may also be used in various embodiments include, for example and without limitation, X10, RS-485, 6LoWPAN, Bluetooth LE (BLE), ZigBee, Z-Wave, and/or a low power wide-area networks (LPWAN), such as a chirp spread spectrum (CSS) modulation technology (e.g. LoRa) or network protocol (e.g., LoRaWAN), an Ultra Narrow Band modulation technology network (e.g., Sigfox, Telensa, NB-IoT, etc.), RingNet, and/or the like.

Accordingly, in various embodiments, the network 120 may be any wireless network, any wired network, or a combination thereof, configured to operatively couple the modules, devices, components, and/or systems as illustrated in FIG. 1. For example, the network 102 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The network device 106(a) may be a virtual assistant (VA) device that receives voice commands, processes the voice commands to determine one or more actions and/or responses, and performs the one or more actions and/or responses, such as to activate, change, and/or retrieve the status of one or more of the endpoint devices 108. The virtual assistant device may include a display screen and/or touchscreen. The virtual assistant device includes a plurality of microphones and may include one or more cameras. The network device 106(b) may be a hub device that facilitates communication with and control of endpoint devices 108. For example, the network device 106(b) may be a component of a security system and/or a home automation system installed at a location (e.g., a property, a premises, a home, a business, etc.). In some embodiments, the network device 106(b) may communicate through the network 102 with a client device (e.g., a smartphone, tablet, laptop, desktop computer, etc.) so that aspects of a security or home automation system (e.g., the endpoint device 108) may be remotely controlled by the client device.

The network device 106(c) may be a bridge device that bridges communications between the network 102 and endpoint devices (e.g., the pathway lights 108(e)), where the endpoint devices use a different communication technology, protocol, or format than other devices in the network 102. The bridge device may, for example, include a first radio (e.g., a WiFi radio) for communicating with the network 102, and include a second radio (e.g., a 900 MHz radio) for communicating with the pathway lights 108(e). The network device 106(d) may be a video doorbell A/V device that can record audio and/or video of a person upon pressing of a doorbell button or upon detection of motion. The network device 106(d) may also transmit audio and/or video via the network to a client device so that, for example, a user may communicate with a person at their front door using the client device and the network device 106(d).

An example of endpoint devices 108(a) and 108(b) may be pet locator tags that are capable of passive or active communication with the network devices 106. The pet locator tags may be placed on a pet (or on any other object) to determine and/or track a location of the pet. The location of a pet locator tag may be determined, in part, based on network devices that the pet locator tag communicates with. If a pet locator tag goes missing, other network devices not ordinarily paired with the pet locator tag may be instructed via the network 102 to attempt to communicate with the pet locator tag to locate the pet locator tag.

Another example of endpoint devices 108(c) and 108(d) may be sensors. For example, the endpoint device 108(c) may be a motion sensor that detects motion for a security system, for control of a motion activated light, etc. The endpoint device 108(d) may be a smoke detector, carbon monoxide detector, or some other type of sensor. The endpoint device 108(e) may be set of pathway lights. The network device 106(c) may be able to directly communicate with each of the pathway lights, or may communicate with a first pathway light, and the other pathway lights are communicated with via the first pathway lights. In any case, the pathway lights may be controlled via communications received via the network device 106(c).

The endpoint devices 108 may not be in direct communication with the network 102 in FIG. 1. Rather, the endpoint devices 108 communicate with the network 102 via the network devices 106. Each of the endpoint devices 108 in FIG. 1 is depicted as being paired with a single one of the network devices 106. However, in various embodiments, the endpoint devices 108 of FIG. 1 may be capable of wirelessly communicating with more than one of the network devices 106 when multiple of the network devices 106 are within communication range.

In embodiments, a communication intended for the network device 106(c) may be routed through any of the network devices 106(a), 106(b), and/or 106(d), because they are all capable of communicating directly or indirectly with one another without passing a communication through the network 102. For example, a communication from the server(s) destined for the network device 106(c) may be sent straight to the network device 106(c) because the network device 106(c) is in communication with the network 102. However, if there is an outage of the connection between the network device 106(c) and the network 102, a communication may be routed through either of the network device 106(b) or the network device 106(d) to pass on to the network device 106(c). If there is an outage of the connections between the network 102 and each of the network devices 106(b), 106(c), and the network device 106(d), a communication to any of the network devices 106(b), 106 (c), and the network device 106(d) may be routed through the network device 106(a). For example, a communication may be routed from the server(s) 104 through the network 102 to the network device 106(a), then to the network device 106(b), and finally to the network device 106(c). In this way, a network connectivity graph or table built by the server(s) 104 may be used to properly route communications if there is an outage in connectivity for a network device. Advantageously, the embodiments described herein therefore provide for systems that have more up-time, providing more security and usability for a user. For example, if there is an outage of internet connectivity at a user's home who has an A/V device (e.g., the network device 106(d)) installed at their front door, an audio/video communication may still be established between the A/V device and a user's electronic device because the communications with the A/V device may be routed through, for example, one or more of the user's neighbor's network devices.

The server(s) 104 may further use the network connectivity graph or table and the information received from the various network devices for other purposes, such as efficiently routing traffic in the system 100. For example, if the connection between the network device 106(b) and the network 102 is down, the server(s) 104 may refer to the network connectivity graph or table to determine that communications for the network device 106(b) may be routed through the network device 106(a) or the network device 106(c). However, the SNR and/or RSSI data received from any of the network devices 106(a), 106(b), and/or 106(c) may indicate that one of the network devices 106(a) or 106(c) may have a stronger or more reliable connection with the network device 106(b). Accordingly, the server(s) 104 may determine how to route communications based on the additional information received in the messages from the network devices of the system 100. In another example, the server(s) 104 may be able to determine an amount of traffic already occurring between the network 102 and each of the network devices 106(a) and 106(c). In such an example, the server(s) 104 may route traffic to the network device 106(b) to whichever of the network devices 106(a) or 106(c) currently has less traffic.

For an endpoint device 108 to operate on the network implemented via the system 100, that endpoint device 108 must first be connected to the network. In embodiments, the system 100 supports both synchronous and asynchronous connection modes for an endpoint device. In a synchronous mode, the endpoint device 108 may synchronize with a single network device 106 before communicating with other electronic devices in the system through that network device 106. In an asynchronous mode, an endpoint device 108 transmits messages that can be received by multiple network devices 106.

In embodiments, an endpoint device 108 may need to be paired with a network device 106 before the endpoint device 108 can be connected to the network. However, some communications protocols (such as Bluetooth) may typically require initiation (e.g., initiation by a user) of such a pairing prior to establishing the communication session. If a user is unavailable or unwilling to initiate the pairing, then the endpoint may typically be unable to establish the communication session.

In the described system, the endpoint device may provide a request to the servers 104 via one or more of the network devices 106 (e.g., a closest network device) using a different communication protocol. In such a scenario, the server 104 may identify a network device 106 that should establish a communication session with the endpoint device 108 and may provide instructions to the identified network device 106 to cause it to initiate the pairing with the endpoint device in order to establish the communication session. In some cases, the server 104 may select an appropriate network device 106 to initiate the pairing based on information about the network devices and/or the endpoint device. Note that this enables endpoint devices that are typically unable to independently connect to a network (e.g., an "accessory" or "peripheral" device) to cause a network device to connect to it, providing it with the ability to connect to the network.

Endpoint devices 108 associated with a particular service may first need to register with an operator of that service before they can begin communicating with the other electronic devices in the system 100. In some embodiments, such registration requires keys that are provisioned onto the endpoint device 108 (e.g., at the time of manufacture). In some embodiments, a key may be a string of characters that is unique to the endpoint device 108 or a type associated with that endpoint device 108. A key may be stored in a secure memory of an endpoint device 108. In some cases, the key may be encrypted or otherwise subjected to access controls.

Endpoint devices 108 may communicate with network devices 106 using any suitable protocol. By way of non-limiting example, such communications may be Amazon Sidewalk SubG (referred to as SubG-FSK), LoRa® radio (referred to as SubG-CSS), or Bluetooth® Low Energy (referred to as BLE). In general, endpoint devices 108 and network devices 106 communicate using frames. Frames can carry commands to control the connection, and/or data to communicate with the server 104. Endpoint devices 108 that are not actively communicating with network devices 106 can enter a low power mode. In such cases, Power Profiles stored on the endpoint device 108 may be used to manage low power behavior.

Figure 2:
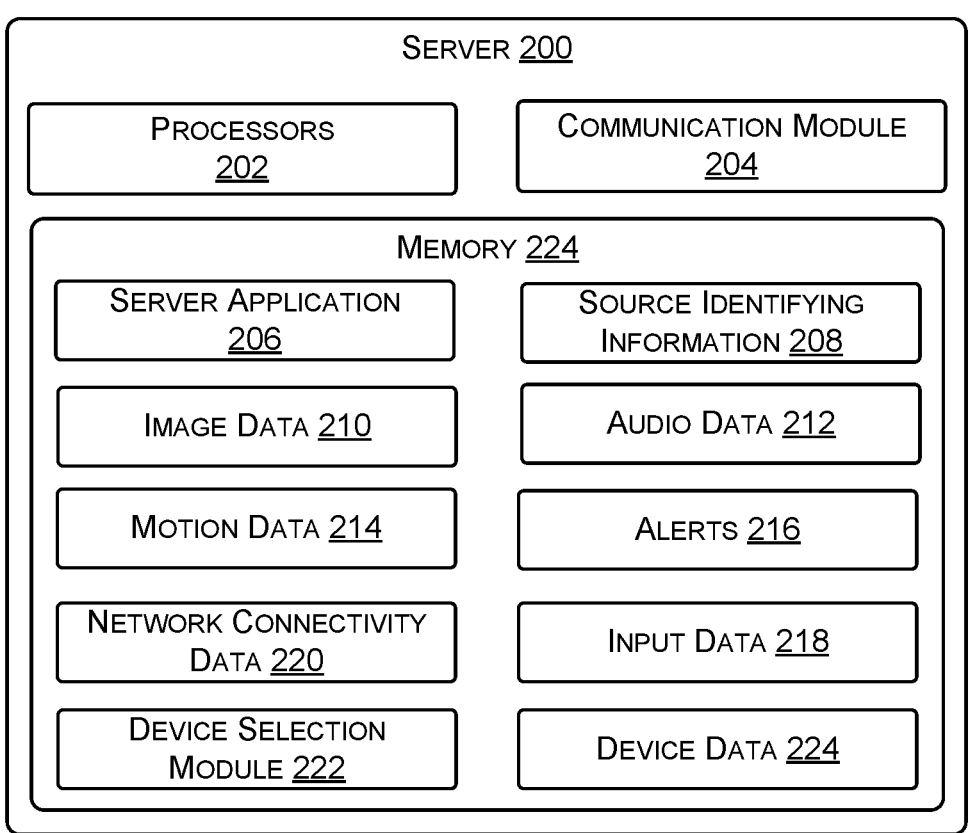
FIG. 2 is a functional block diagram illustrating one embodiment of a server according to various aspects of the present disclosure.

FIG. 2 is a functional block diagram illustrating one embodiment of a server 200 according to various aspects of the present disclosure. The server 200 is an example of the server(s) 104 (FIG. 1), and may comprise processor(s) 202, a communication module 204, and a memory 224. The communication module 204 may allow the server 200 to access and communicate with devices (e.g., the network devices 106, the endpoint devices 108) connected to the network 102 (e.g., Internet/PSTN).

The processor(s) 202 (alternatively referred to herein as a "CPU," a "controller," and/or a "microcontroller) may comprise an integrated circuit including a processor core, memory, and programmable input/output peripherals. The processor(s) 202 may receive input signals, such as data and/or power, from the network devices 106 and/or the endpoint devices 108, and may perform various functions as described in the present disclosure. The communication module 204 may comprise an integrated circuit including a processor core, memory, and programmable input/output peripherals. The communication module 204 may be operatively connected to the processor(s) 202. In some embodiments, the communication module 204 is configured to handle communication links between the server 200 and other, external devices, external receivers, external transmitters, and/or external transceivers, including the network devices 106, and to route incoming/outgoing data appropriately.

Image data 210 may be stored on the memory 224, which may include image sensor data such as (but not limited to) exposure values and data regarding pixel values for a particular sized grid. The image data 210 may include still images, live video, and/or pre-recorded images and/or video. The image data 210 may be recorded by a camera of an A/V device, such as the network device 106(d). Audio data 212 may also be stored in the memory 224, and may include audio processed by and/or recorded by an A/V device (e.g., the network device 106(d)) or a VA device (e.g., the network device 106(a)). Motion data 214 may also be stored on the memory 224 and may include motion sensor data generated in response to motion events (e.g., from the network device 106(d) and/or the endpoint device 108(c)). For example, the motion data 214 may include an amount or level of a data type generated by the endpoint device 108(c). Motion data 214 may also be generated by a camera (e.g., of the network device 106(d)). In such embodiments, based on a frame-by-frame comparison of changes in the pixels from the image data 210, it may be determined that motion is present.

Alert(s) 216 may also be stored on the memory 224. Alert(s) 216 may be generated by any of the endpoint devices 108 and/or network devices 106 and transmitted to a client device, the server 200, and/or any of the network devices 106. For example, in response to detecting motion using a camera of the network device 106(d) and/or the endpoint device 108(c), the server(s) 200 may generate and transmit an alert. In some of the present embodiments, the alert may include any of the image data 210, the audio data 212, and/or the motion data 214.

Input data 218 may also be stored in the memory 224. The input data 218 may include data generated in response to an input of a button, such as a button of the network device 106(d). The button may receive an input (e.g., a press, a touch, a series of touches and/or presses, etc.) and may generate the input data 218 in response that is indicative of the type of input.

The memory 224 may also include a server application 206 comprising instructions that the processor(s) 202 execute(s) to receive and/or retrieve the audio data 212, the input data 218, the alert(s) 216, the image data 210, and/or the motion data 214 from any of the endpoint devices 108 and/or the network devices 106. The server application 206 may also configure the processor(s) 202 to transmit (and/or forward) the audio data 212, the input data 218, the alert(s) 216, the image data 210, and/or the motion data 214 to any of the endpoint devices 108, the network devices 106, and/or a client device using the communication module 204.

Although referred to as the server 200 with reference to the processes described herein, the server 200 may additionally, or alternatively, include one or more of the devices from a network(s) of servers/backend devices, such as (but not limited to) one or more remote storage devices (which may be referred to interchangeably as "cloud storage device (s)"), one or more servers, and one or more backend application programming interfaces (APIs). While FIG. 1 illustrates the server(s) 104 and the network 102 as separate components, it is to be further understood that the server 200 may be considered to be components of the network 102. For example, the network 102 may include a data center with a plurality of computing resources used to implement a storage device, one or more servers, and an API. The server(s) 200 may therefore additionally include similar components and functionality as any combination of the network 102 and the server(s) 104 of FIG. 1.

In addition, the server 200 may include information about which network devices 106 are in communication with each other as well as which network devices 106 are in communication with various endpoint devices 108, which may be stored as the network connectivity data 220. As described herein, the network connectivity data 220 (which may be or may include a network connectivity graph or table) may be used to route communications to or between different network devices and/or their endpoint devices.

In embodiments, the memory 224 may include at least one module for identifying a network device to be provided instructions to initiate a communication session (e.g., device selection module 222). In embodiments, the server receives a request from an endpoint device to initiate a communication session. Upon receiving such a request, the device selection module 222 may be configured to identify a network device to be paired with the endpoint device from which the request was received. In embodiments, the device selection module 222 may identify the network device based on any combination of suitable factors (as maintained in device data 224 that includes information about various network and/or endpoint devices).

For example, the network device may be selected based on a strength of a signal (detected or predicted) between the endpoint device and the selected network device, a distance between the endpoint device and the selected network device, an identity of an owner/operator (e.g., as determined based on a Personal Area Network (PAN) credential), etc. In this example, upon receiving a request to establish a communication session between an endpoint device and a network device, the device selection module 222 may be configured to identify a network device associated with the same owner as the endpoint device that is closest to that endpoint device. The device selection module 222 may then be configured to transmit instructions to that network device to cause it to initiate a communication session with the endpoint device. In some cases, the device selection module 222 may provide an indication of a device identifier for the endpoint device to the network device.

Figure 3:
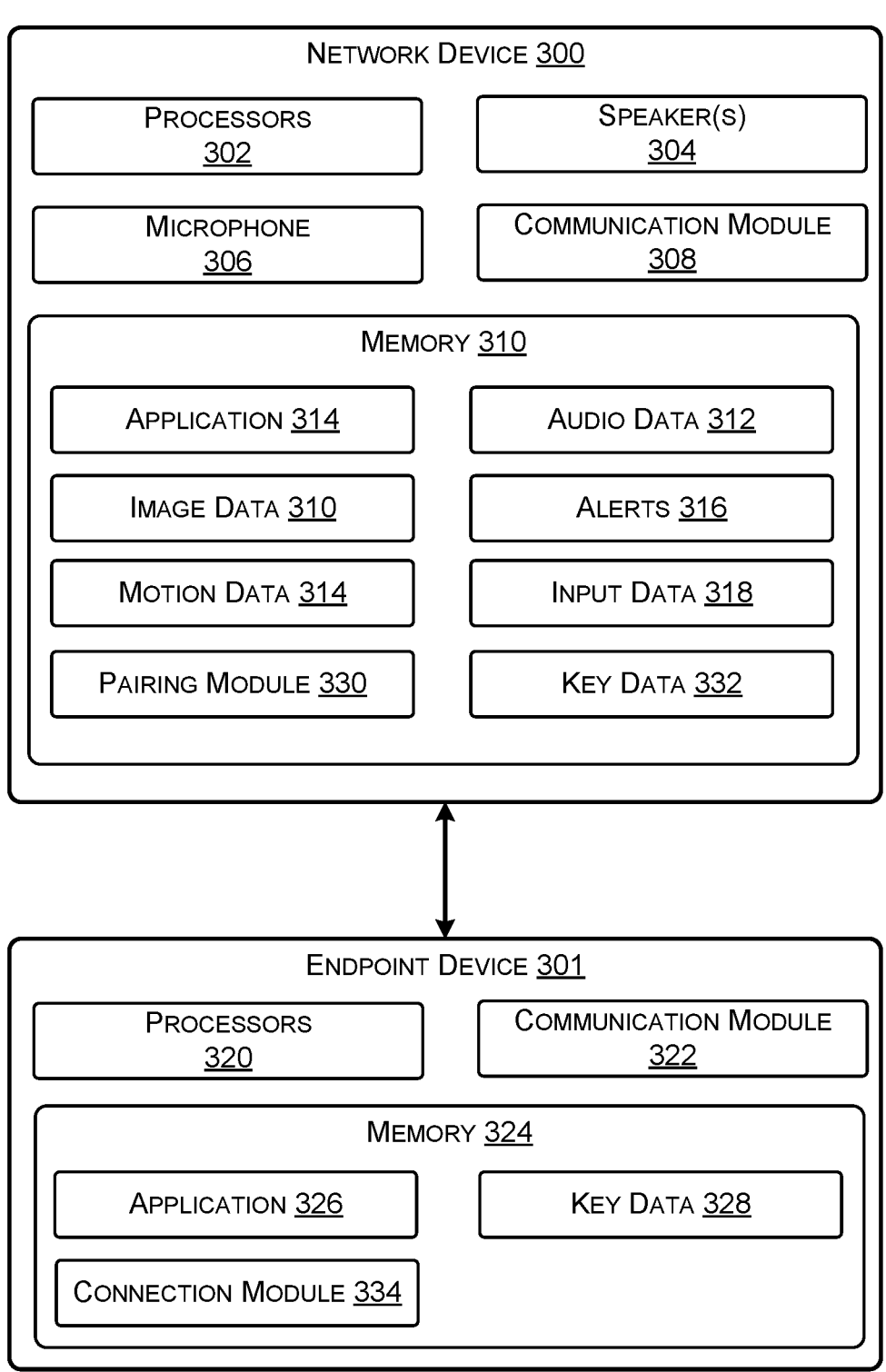
FIG. 3 is a functional block diagram illustrating an embodiment of a network device in communication with an endpoint device according to various aspects of the present disclosure.

FIG. 3 is a functional block diagram illustrating an embodiment of a network device 300 in communication with an endpoint device 301 according to various aspects of the present disclosure. The network device 300 is an example of the network devices 106 (FIG. 1), and may be, for example, a WiFi hub, a hub of a home automation system ("smart-home" hub), a hub of a home security/alarm system, a floodlight camera, a video doorbell, a bridge device, and/or any other type of device having similar components and/or functions. In some examples, the network device 300 may include the functionality of a VA device (e.g., the network device 106(a)). The network device 300 may comprise processor(s) 302 (which may be similar to, and/or include similar functionality as, the processor(s) 202) that are operatively connected to speaker(s) 304, microphone(s) 306, a communication module 308 (which may be similar to, and/or include similar functionality as, the communication module 204), and memory 310 (which may be similar to, and/or include similar functionality as, the memory 224). In some embodiments, the network device 300 may further comprise one or more cameras (not shown). In some embodiments, the network device 300 may not include one or more of the components shown in FIG. 3, such as the speaker(s) 304 and/or the microphone(s) 306.

As shown in the example of FIG. 3, the memory 310 stores an application 314 comprising instructions that the processor(s) 302 execute(s) to receive sensor data from sensors (e.g., the endpoint devices 108(c), 108(d)) and/or the automation devices (e.g., the endpoint devices 108(a), 108(b), 108(e)). For example, the sensor data may include a current state (e.g., opened/closed for door and window sensors, motion detected for motion sensors, living room lights on/off for a lighting automation system, etc.) of each of the sensors and/or the automation devices. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors and/or the automation devices as well as any updates to the current state based on sensor triggers.

With further reference to FIG. 3, the application 314 may configure the processor(s) 302 to receive the audio data 212, the image data 210, the motion data 214, the input data 218, and/or the alert(s) 216 from another network device 106 (in some embodiments, via the server 200) or an endpoint device 301 using the communication module 308. For example, the network device 300 may receive and/or retrieve (e.g., after receiving a signal from the network device 106(d) that the network device 106(d) has been activated) the image data 210, the input data 218, and/or the motion data 214 from the network device 106(d) and/or the server 200 in response to motion being detected by the network device 106(d). The application 314 may then configure the processor(s) 302 to transmit, using the communication module 308, the audio data 212, the image data 210, the motion data 214, the input data 218, and/or the alert(s) 216 to the server 200, and/or an additional electronic device (e.g., any of the other network devices 106 or the endpoint devices 108).

The memory 310 may further include at least a module for initiating a communication protocol pairing (e.g., a Bluetooth pairing) with an endpoint device absent user interaction (e.g., pairing module 330). In embodiments, the pairing module 330 may be configured to receive instructions from a server (e.g., from device selection module 222) to initiate a pairing between itself and an endpoint device 301. The instructions may further include a device identifier that can be used to uniquely identify the endpoint device 301 with which the pairing is to be performed. Upon receiving the instructions, the pairing module 330 may establish a communication session with the endpoint device using the communication protocol.

In some embodiments, the network device 300 may be configured to authenticate itself to the endpoint device. To do this, the pairing module 330 may be configured to provide a digital signature to the endpoint device 301. For example, the network device 300 may generate a digital signature using cryptographic key data stored by the network device (e.g., key data 332). In this example, the pairing module 330 may be configured to answer a challenge made by the endpoint device by providing the digital signature. The digital signature may include information that is known to the endpoint device (e.g., the device identifier for that endpoint device) that has been cryptographically obfuscated using a private cryptographic key associated with the network or with the network device itself. In some embodiments, the network device 300 may maintain multiple cryptographic keys in key data 332 and may select an appropriate cryptographic key to be used in generating the digital signature based on a certificate associated with the endpoint device 301.

In embodiments, the network device 300 may be configured to receive communications from an endpoint device that use a different communication protocol than what is typically used to establish communications between the two devices. In such cases, the endpoint device may indicate (e.g., via an indication included in the communication protocol) that the endpoint device should be connected to a local network. For example, such an indication may be a bit or other indicator included in a portion (e.g., a header) of the communication. Upon receiving such a communication, the network device 300 may be configured to relay the communication to a backend server (e.g., server 200) to be processed by the device selection module 222). In some embodiments, such a communication may be a beacon transmission that can be received by any network device in communication range of the endpoint device. The beacon transmission may be unencrypted in order to allow any network device 300 to relay it to the backend server. In some cases, the endpoint device 301 may transmit such a communication on a recurring periodic basis.

An endpoint device 301 may be any suitable electronic device capable of performing the functionality described herein. In some cases, an endpoint device 301 may be a special-purpose electronic device, such as a device configured to detect one or more conditions (e.g., a smoke detector). The endpoint device 301 is an example of the endpoint devices 108 as described in relation to FIG. 1 above. The endpoint device 301 may comprise processor(s) 320 (which may be similar to, and/or include similar functionality as, the processor(s) 302) that are operatively connected to a communication module 322 (which may be similar to, and/or include similar functionality as, the communication module 308), and memory 324 (which may be similar to, and/or include similar functionality as, the memory 310). In some embodiments, the endpoint device 301 may further comprise one or more sensors (not shown), such as motion sensors or light sensors.

As shown in the example of FIG. 3, the memory 324 stores an application 326 comprising instructions that the processor 320 executes to perform a primary function of the endpoint device and to communicate with the network device 300. In some embodiments, prior to establishing communication between the network device 300 and the endpoint device 301, the endpoint device must first be registered with a network that includes the network device 300. In embodiments, this may involve verification of cryptographic key data (e.g., key data 328) stored in the memory 324 of the endpoint device 301. Such key data may include at least one cryptographic key or other identifier that has been provisioned onto the endpoint device 301 by a manufacturer or other entity.

The memory 324 may further include at least a module for establishing a communication session between the endpoint device and a network (e.g., connection module 334). In embodiments, the connection module 334 may broadcast a beacon signal using a first communication protocol. That beacon signal may include an indication that the endpoint device 301 has information to convey over a network connection. In some embodiments, this may involve transmitting a beacon using the first communication protocol that includes a data value in its header indicating that the endpoint device should be connected to a local network. Such a beacon transmission may be unencrypted so that it can be picked up by any network device in wireless communication range of the endpoint device. In some cases, the beacon signal may include an indication of a device identifier associated with the endpoint device 301.

Additionally, the connection module 334 may be configured to establish a communication session with a network device that initiates a communication protocol pairing using a second communication protocol. In such cases, the connection module 334 may be configured to receive a connection request from the endpoint device 300 and may provide a challenge to the endpoint device in response to receiving the request. Upon receiving a response to the challenge, the connection module 334 may be configured to authenticate the endpoint device based on a digital signature appended to the response. This may involve retrieving a public key from key data 328 that may be used to verify the authenticity of the digital signature. In embodiments, upon authenticating the request received from the endpoint device, the connection module 334 may be configured to establish a communication session between the endpoint device 301 and the network device 300. In some cases, communications routed over the communication session may be encrypted using cryptographic keys selected based on a security certificate on the endpoint device and/or the network device.

Communications relayed between a network device 300 and an endpoint device may be relayed via an operating channel. The operating channel used by a network device may be picked randomly, may be assigned by a server, may be pre-programmed on a network device, or may be chosen by the network device or a nearby other network device. For example, where the operating channel is chosen by a network device, the network device may select an operating channel that other nearby network devices are not using. Such a selection may occur by scanning through the channels upon startup to determine a channel that has less traffic compared to other channels, or no traffic. In another example, the network device may communicate with other network devices nearby through a network or directly to request a channel that the nearby network device(s) are operating in, so that a channel not being used may be selected by the network device.

An operating channel of a given network device is used as a channel for communication with one or more endpoint devices (e.g., the endpoint devices 108 of FIG. 1). A network device may utilize multiple operating channels at once. Network devices typically communicate with the endpoint devices to receive messages or alerts from the endpoint devices, control the endpoint devices, or otherwise communicate with the endpoint devices. For example, a 900 MHz communication band may have 8 channels, so a network device may be assigned, or may choose, any of the 8 available channels for communication with its paired endpoint devices. The operating channel also may be different than a channel over which a network device (e.g., one of the network devices 106 of FIG. 1) communicates over a network (e.g., the network 102). For example, if the network 102 is a WiFi network, a network device may communicate with the WiFi network over a WiFi channel assigned by a WiFi router using the network device's WiFi communication hardware, while communicating over a channel of a different wireless protocol (e.g., the 900 MHz communication band) with any endpoint devices using separate wireless communication hardware.

Figure 4:
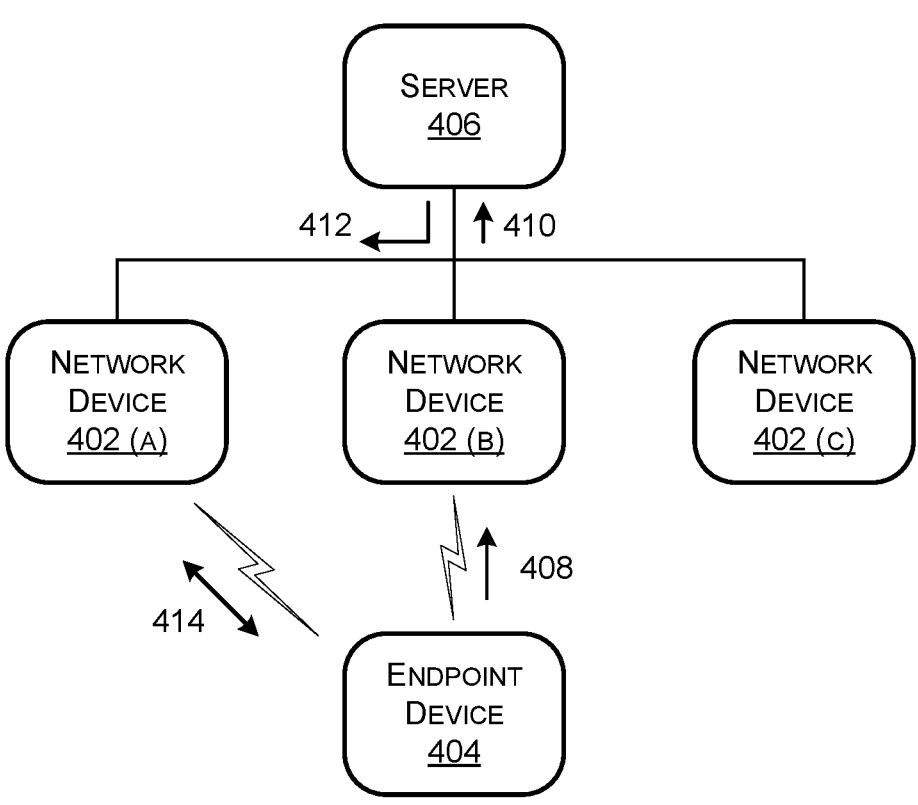
FIG. 4 depicts a block diagram illustrating exemplary interactions that may be performed between various components in accordance with at least some embodiments.

FIG. 4 depicts a block diagram illustrating exemplary interactions that may be performed between various components in accordance with at least some embodiments. More particularly, FIG. 4 depicts exemplary interactions that may occur between one or more network devices 402 (A-C), an endpoint device 404, and a server 406. A server 406 may be an example of the server 200 as described in relation to FIG. 2 above. Likewise, the network device 402 and endpoint device 404 may be examples of the respective network device 300 and endpoint device 301 as described in relation to FIG. 3 above.

In an exemplary embodiment, a network may include a number of network devices 402 distributed throughout a geographic area (e.g., a house or other building). The network may include any suitable wireless area network as described herein. Each of the network devices 402 may be configured to receive communications (e.g., beacons) that are transmitted by various endpoint devices in wireless communication range of the respective network device.

In some embodiments, an endpoint device 404 may transmit a beacon 408 using a first communication protocol that indicates an availability of the endpoint device 404 to communicate with the network. The beacon 408 may be received by a network device (e.g., network device 402 (B), which may determine that the endpoint device is available based on information included in the beacon (e.g., within a header of the beacon). In some cases, the beacon 408 may be broadcast by the endpoint device 404 to any network device 402 in wireless communication range, such that it might be received by network device 402 (B). Note that because the beacon 408 can be received by any suitable network device, it may be unencrypted so that it can any network device can extract the relevant information.

Upon receiving the beacon 408, a network device 402 (B) may be configured to relay a message 410 that includes at least a portion of the information included in that beacon to the server 406. For example, the message 410 may include at least a device identifier that can be used to uniquely identify the endpoint device 404. In some embodiments, the message 410 may further include an indication of a location of the network device 402 (e.g., global positioning system (GPS) location data). In some embodiments, the message 410 may further include an indication of a network identifier for a network on which the network device 402 is operating. In some cases, the message 410 may further include information about the reception of the beacon 408 by the network device. For example, the message 410 may include an indication of a signal strength associated with the received beacon 408. In accordance with one or more implementations, a beacon may be an advertisement message or beacon in accordance with a Bluetooth Low Energy protocol or scheme.

It should be noted that since the beacon 408 may be received from a number of different network devices 402 in wireless communication range of the endpoint device 404, the server 406 may receive a number of equivalent messages 410 related to the same endpoint device 404. In some cases, the server may aggregate information received from each of the messages 410 received from each of the network devices 402 in relation to a single endpoint device 404, e.g. perform deduplication by deleting or ignoring duplicate versions of the same message.

Upon receiving the message 410, the server 406 may be configured to determine whether the endpoint device 404 should be connected to a network. Upon determining that the endpoint device 404 should be connected to a network, the server 406 may identify an appropriate network device 402 (A) to which that endpoint device 404 should be connected. The server 406 may identify a number of network devices 402 (A-C) operating on that particular network. The server 406 may identify a network device 402 (A) to which the endpoint device 404 is to be connected based on a number of factors. In some embodiments, the network device 402 (A) may be determined based on a signal strength determined between that network device and the endpoint device 404 (e.g., as indicated via the message 410). In some embodiments, the network device 402 (A) may be determined based on a common ownership between that network device and the endpoint device 404. For example, upon identifying a number of network devices operating within range of the endpoint device 404, the server may determine which of those network devices are owned by the same user as the endpoint device 404. In some embodiments, the network device 402 (A) may be determined based on a relative location. For example, the server 406 may select the network device 402 (A) based on that network device being the closest network device to the endpoint device 404. In some embodiments, the server 406 may select the network device 402 (A) based on one or more capabilities (e.g., communication or encryption protocols) available to the network device.

Once the server 406 has identified the network device 402 (A) to be connected to the endpoint device 404, the server may transmit a message 412 to that network device 402 (A). The message 412 may include instructions to cause the network device 402 (A) to initiate a pairing operation with the endpoint device 404. In embodiments, the message 412 may include the device identifier for the endpoint device 404. In embodiments, the server 406 may identify one or more security protocols associated with the endpoint device

404. In some cases, such security protocols may be determined based on a type or category (e.g., model, version, etc.) associated with the endpoint device (e.g., as determined based on the device identifier). In these embodiments, the message 412 may further include information about the identified security protocols. In some cases, the message 412 may further include an indication of a communication protocol to be used by the endpoint device 404, which may be different from the communication protocol used to transmit the beacon 408.

In accordance with one or more implementations, the message 412 represents or comprises a challenge request. In accordance with one or more implementations, this challenge request comprises first data representing a unique identifier associated with the requesting endpoint device 404 that has been encrypted using a network key.

In accordance with one or more implementations, a device such as endpoint device 412 is associated with a plurality of device identifiers, such as, for example, a thirty two byte manufacturer serial number (MSN), a five byte device id (device ID), and a five byte device transmission id (TXID). In accordance with one or more implementations, a manufacturer serial number is used at the time of device registration to determine a device network id that represents an identifier (that may be a unique identifier) used on the network for that device.

In accordance with one or more implementations, a network key is determined and shared during device registration and periodically during a key refresh process. In accordance with one or more implementations, this network key is determined between two devices using an elliptic curve Diffie Hellman approach, e.g. based in part on a private key stored in persistent memory or hardware at an end node device.

In accordance with one or more implementations, a remote system or server generates an ephemeral key pair and exchanges its public key with an endpoint device (e.g. via a user device such as a phone or a gateway device such as a camera device, router device, or personal assistant device). The endpoint device generates an ephemeral key pair and exchanges its public key with the server. The server and the endpoint device generate a shared secret network key using an elliptic curve Diffie Hellman approach. The devices use a pre-defined formula to generate the symmetric secret key from the shared secret. This symmetric secret key is the network key. The server generates a temporary key from the network key. The server uses the temporary key to encrypt a payload, then the payload is sent to the endpoint device for validation. The endpoint device decrypts the encrypted packet and verifies the content. If the endpoint device successfully decrypts and verifies the content, the endpoint device sends an uplink message to the server with an encrypted packet indicating successful verification. If the server receives the uplink packet, the server decrypts the encrypted portion and validates it against the payload content sent on the downlink. If verification is successful, both the server and the endpoint device save the network key to a database record.

Following registration, the network key is used to generate a device id obfuscation key. This device id obfuscation key is then used to generate a device transmission id (TXID) that is used for transmissions to avoid transmitting the manufacturer serial number or device id.

In accordance with one or more implementations, the message 412 represents or comprises a challenge request including first data representing the device id (device ID) for the requesting endpoint device 404 that has been encrypted using the network key. In accordance with one or more implementations, the message 412 represents or comprises a challenge request including first data representing a manufacturer serial number (MSN) for the requesting endpoint device 412 that has been encrypted using the network key. In either case, the message 412 may also include either in a header or a body a device transmission id (TXID), e.g. used to address the challenge to the endpoint device 404.

Upon receiving the message 412, the network device 402 (A) forwards data from the message 412 (e.g. a challenge request) on to the endpoint device 404. This message to the endpoint device 404 from the network device 402 may include a header comprising the device transmission id (TXID) for the endpoint device 404. Such a challenge request may comprise a digital signature in which some portion of data (e.g., a device identifier for the endpoint device 404) is cryptographically obfuscated using a shared key (e.g. a network key) or private cryptographic key associated with the network or with the network device 402 (A). Such a digital signature can be authenticated using the shared key or using a public cryptographic key associated with the network or with the network device 402 (A). For example, where the challenge request comprises a device id (device ID) associated with the endpoint device 404 that has been encrypted using a network key, the endpoint device 404 decrypts the challenge request using the shared network key and then compares the decrypted data to a stored unique identifier for itself. Once the endpoint device 404 has authenticated the network device 402 (A), a communication session may be established between the endpoint device 404 and the network device 402 (A). In some embodiments, one or more cryptographic keys may be identified for use in securing communications between the two devices. Such cryptographic keys may be selected based on a security certificate associated with the endpoint device 404. Communications transmitted over the communication session may encrypted using the identified cryptographic keys.

Figure 5:
FIG. 5 depicts a block diagram illustrating an exemplary process that may be performed to connect an endpoint device to a network in accordance with at least some embodiments.
Figure 5:
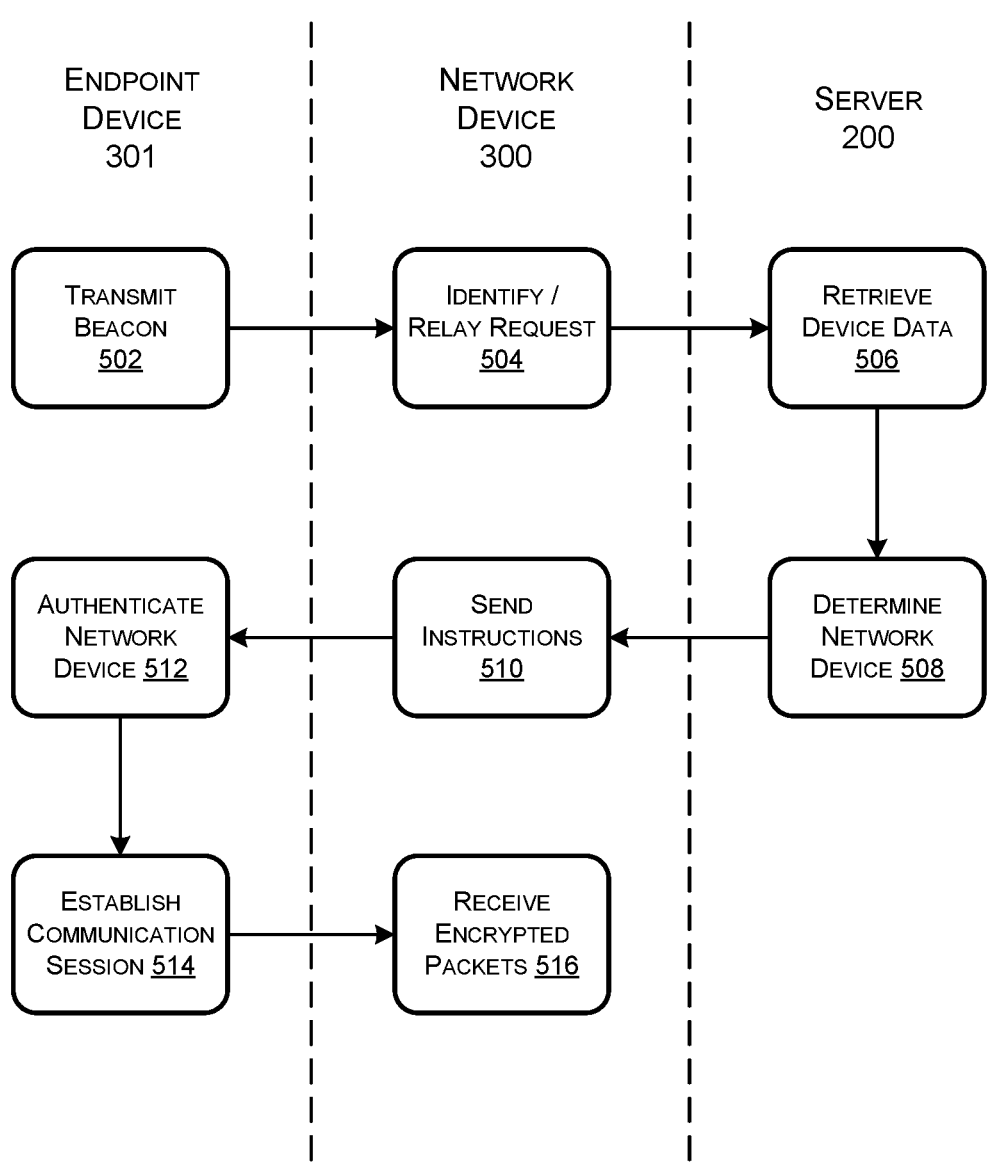

FIG. 5 depicts a block diagram illustrating an exemplary process that may be performed to connect an endpoint device to a network in accordance with at least some embodiments. More particularly, portions of the process 500 may be performed by the server 200 as described in relation to FIG. 2 above, as well as the network device 300 and endpoint device 301 as described in relation to FIG. 3 above.

As noted elsewhere, an endpoint device 301 may be configured to generate and transmit a beacon at 502. The beacon may be targeted toward a particular network device 300, or the beacon may be broadcast to any network device in its vicinity. The beacon may include at least a device identifier associated with the endpoint device. In embodiments, a beacon generated by the endpoint device may serve a number of different purposes, some of which are discussed below.

In a first example, the beacon may be used to convey a time sync request to at least one network device and/or server. In this example, the beacon may include information about timing currently used by the edge device to receive data packets and/or a request to receive timing information that can be used by the endpoint device. Note that such timing information may be used by one or more devices to schedule wake intervals during which a radio transceiver is activated in order to receive communications. In this first example, the time sync beacon may be used by the network device and/or server to time communications directed toward the endpoint device. Alternatively, the network device and/or server may, upon receiving the time sync beacon, provide timing information to the endpoint device to be implemented on that endpoint device.

In another example, the beacon may be used to convey a provisioning request in order to initialize a device provisioning flow for device to operate on the network. In this example, the beacon may include information about the endpoint device to be provisioned onto the network. For example, the beacon may include information about a type (e.g., model, version, etc.) of the endpoint device, security certificates/protocols used by the endpoint device, communication protocols used by the endpoint device, or any other suitable information related to the endpoint device.

In another example, the beacon may be used to notify the network of the presence of the endpoint device. In this example, the beacon may be a "no data" beacon that includes no information payload. Such a beacon may include information in a header (e.g., a flag or other indicator) that indicates that the endpoint device is available for connection.

Certain communication protocols (e.g., BLUETOOTH™ or BLUETOOTH LOW ENERGY™ (BLE)) may require that a connection between an endpoint device and a network device must be initiated by the network device. However, as would be recognized by one skilled in the art, this would be problematic if the network device is unaware of the presence of the endpoint device. Hence, absent user initiation of a connection using such protocols, endpoint devices may not feasibly be able to communicate with a new network using such communication protocols in conventional systems. Hence, the beacon that is generated by the endpoint device may be transmitted using a communication protocol that is different from the one that endpoint device will eventually use to establish communication with the network. For example, an endpoint device that is configured to communicate primarily using BLE (for energy conservation purposes) may initially generate and transmit a beacon at 502 using a different communication protocol such as the low-frequency radio (LFR) radio protocol.

One or more network device 300 in wireless communication range of the endpoint device 301 may receive the beacon transmitted at 502. Upon receiving such a beacon, each network device may be configured to obtain relevant information from the beacon to be provided to the server 200. The network device may be father configured to identify the nature of the request being made by the endpoint device (e.g., based on a type of the beacon). The network device may relay at least a portion of the information obtained from the beacon to the server at 504. In some cases, the network device may collect additional information related to the transmission of the beacon. For example, upon receiving a beacon, the network device may determine a signal strength associated with the reception of that beacon. In some cases, the network device may further determine a relative distance between the endpoint device and the network device based on a signal strength. Such information may also be provided to the server 200. In some cases, the server 200 may receive the information included in the beacon from multiple different network devices that each received the beacon. In such cases, the server 200 may aggregate the data received from each of the network devices while preventing duplicate requests by the same endpoint device.

Upon receiving a request as generated by one or more network devices based on a beacon, the server 200 may retrieve information stored in relation to the endpoint device 301 at 506. In some cases, the server 200 may retrieve (e.g., based on the device identifier for the endpoint device)

information about an owner/operator of the endpoint device 301. In some embodiments, the server 200 may retrieve information about a type (e.g., model and or version) of the endpoint device as well as one or more capabilities of the endpoint device. For example, the server 200 may determine one or more communication and/or security protocols to be used in communications with the endpoint device.

Upon retrieving information about the endpoint device, the server may make a determination as to whether the endpoint device is authorized to be connected to the network as requested. In some cases, the server determines whether the endpoint device is registered with the network. In some embodiments, the server may determine whether configuration/security settings for the endpoint device are in compliance with those required for operation on the network.

Upon determining that the endpoint device is authorized to operate on the network, the server may further identify a network device to which the endpoint device should be connected at 508. In some cases, the server identifies all of the network devices that generated a request to the server based on the beacon transmitted by the endpoint device. In such cases, the server may determine which of those network devices were associated with the strongest signal strength (or closest distance) to be the network device that is connected to the endpoint device. In some cases, the server determines if any network devices share common ownership with the endpoint device and/or belong to a common grouping (e.g., belong to the same private area network, etc.). In these cases, the server may select a network device fitting that criteria if one is in wireless communication range of the endpoint device.

In some embodiments, the server may generate a challenge request that can be used to authenticate one or more network devices to the endpoint device. In some cases, this may involve encrypting a device identifier for the endpoint device using a network key. This is sometimes referred to as a digital signature.

Once the server has determined a network device to be connected to the endpoint device, the server may send instructions to the endpoint device to cause it to establish a communication session with the endpoint device. In some cases, the instructions may include information that relates to a request made by the endpoint device (e.g., as determined based on information included in the beacon at 502). For example, if the request is a request to provision the endpoint device for operation on a network, then the server may also include (along with the instructions) configuration settings to be provisioned onto the endpoint device. In another example, if the request is a time synchronization request, then the server may also provide timing information to be used by the endpoint device and/or network device. In some cases, the server may provide the network device with a generated challenge response (e.g., an encrypted device identifier) that can be used to authenticate the network device.

Upon receiving the instructions from the server at 510, the network device 300 may perform a handshake with the endpoint device to establish a communication session. It should be noted that the communication protocol used to perform the handshake with the endpoint device may be different from the communication protocol that was used to transmit the beacon at 502. In some cases, the server may provide to the network device an indication of the communication protocol to be used.

In embodiments, when the endpoint device transmits a beacon at 502, it may also expose an application programming interface (API) that may be used to communicate with the endpoint device by network devices that attempt to connect to it. Upon receiving a request to perform a handshake, the endpoint device may attempt to authenticate that the network device is actually associated with the network to which the endpoint device is to be connected at 512. This may involve authenticating a challenge request provided by the network device. To do this, the endpoint device may decrypt a digital signature of the challenge request using a cryptographic key associated with the network (e.g. a network key). The decrypted challenge request is then compared to an expected value. If the values match, then the network device is authenticated. In some cases, the challenge request is provided by the network device when performing the initial handshake. In the event that the network device is unable to be authenticated, the endpoint device may sever the connection with that network device.

Provided that the network device has been authenticated, the endpoint device may accept the request from the network device to establish a connection. The endpoint device may provide a challenge response message to the network device. This challenge response message may itself be encrypted (e.g. with a network key or other key). This challenge response message may also indicate whether the network device has been authenticated. A communication session is established between the endpoint device and the network device at 514. In some cases, transmissions of data over that established communication session may be encrypted using one or more cryptographic keys associated with the network. In some cases, such a cryptographic key may be selected for use based on a security certificate associated with the endpoint device. Encrypted data packets may be received by the network device at 516. In some cases, the network device may be configured to decrypt the encrypted packets. In other cases, the network device may be configured to relay the encrypted packets to the server to be decrypted there.

In some cases, the endpoint device 301 may provide a notification to a user (e.g., via a user interface) to indicate that the endpoint device has connected to the network. For example, the endpoint device may display a notification on a display screen indicating that the connection was established. In another example, the endpoint device may produce an audible signal or other indication to notify the user that a communication session has been established.

Figure 6:
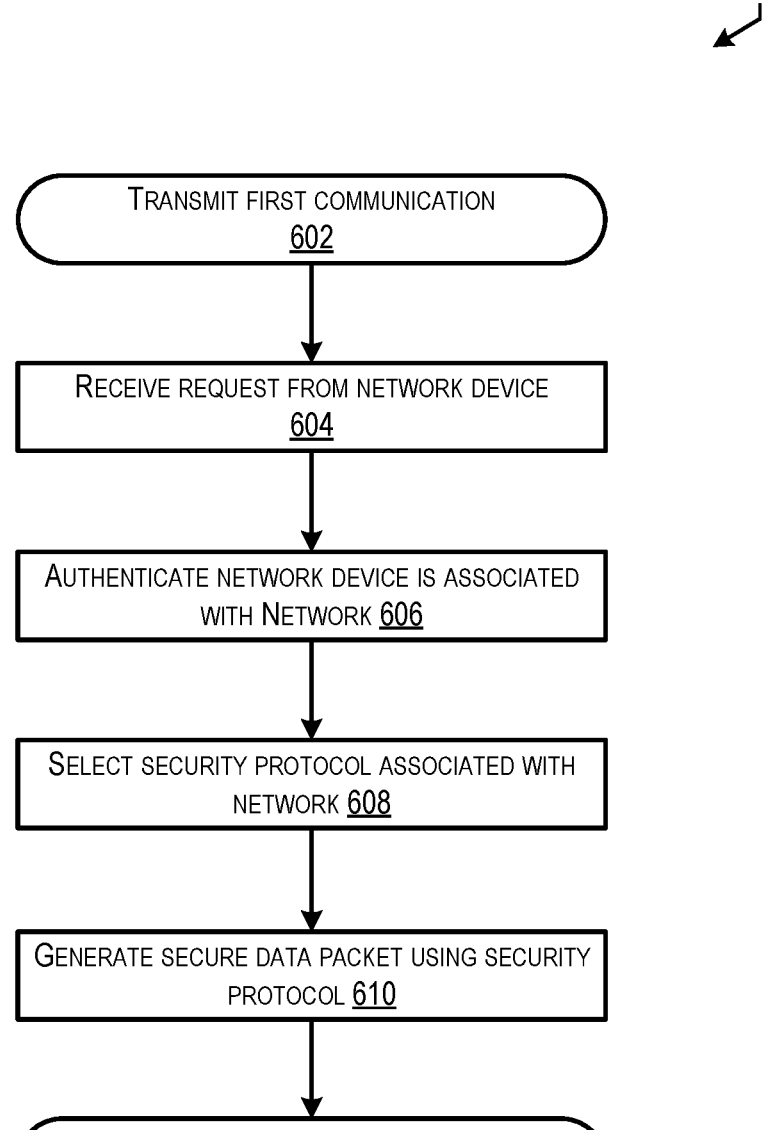
FIG. 6 depicts a flow diagram illustrating a process for establishing communication with a network by an endpoint device in accordance with at least some embodiments.

FIG. 6 depicts a flow diagram illustrating a process for establishing communication with a network by an endpoint device in accordance with at least some embodiments. While the process 600 is depicted as a series of blocks, it should be noted that the steps described in relation to process 600 may be performed in any suitable order. The process 600 may be performed between devices within a network, such as an endpoint device and one or more network devices. For example, the process 600 may be performed by an example of the endpoint device 108 and network device 106 as described in relation to FIG. 1 above. As noted elsewhere, one or more network devices may be in wireless communication with one or more endpoint device.

At 602, the process 600 may involve transmitting a first communication using a first communication protocol. The first communication may be a request to communicate. As noted elsewhere, the first communication may be a beacon that is generated and transmitted by an endpoint device. The first communication may include at least a device identifier (e.g. a transmission device id or TXID) associated with the endpoint device.

In some embodiments, rather than being directed to a particular network device, the first communication may be broadcast to any network device in wireless communication range. Accordingly, the first communication may be received by multiple different network devices in wireless range of the endpoint device. The network device(s) in such a system may be configured to relay at least a portion of the information included in the first communication to a server.

As noted elsewhere, upon receiving the information about the first communication from at least one of the network devices, the server may select a network device to be connected to the endpoint device. In some embodiments, the selected network device is determined from multiple network devices that received the first communication based on at least one of a signal strength of the first communication at the selected network device, a distance between the endpoint device and the selected network device, or a common ownership between the endpoint device and the selected network device.

At 604, the process 600 may involve the endpoint device receiving a request to establish a communication session from a selected network device. The communication session at this step is associated with a second communication protocol that is different from the first communication protocol. In some cases, the request to establish a communication session may be a request to perform a pairing operation.

At 606, the process 600 may involve the endpoint device authenticating that the selected network device is associated with the network. In some cases, the request to establish the communication session may include a challenge request that can be used to authenticate the network device. In such cases, authenticating the network device may involve verifying the challenge request. For example, the challenge request may comprise a digital signature a remote system generated from a device identifier for the endpoint device using a shared cryptographic key associated with the network, and verifying the digital signature maybe done using the shared cryptographic key associated with the network. It should be noted that in some cases the challenge request is generated by the server and provided to the selected network device to be used in authenticating itself. In other cases, the challenge request is generated by the network device itself.

At 608, the process 600 may involve selecting a security protocol to be used in communicating over the network. In embodiments, the security protocol is determined based on a security certificate associated with the electronic device.

At 610, the process 600 may involve generating a secure data packet using the selected security protocol. For example, the security protocol may be an encryption scheme associated with the network. In this example, the secure data packet may be encrypted using that encryption scheme. At 612, the process 600 may involve transmitting the secure data packet using the second communication protocol.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:

generating, by an electronic device, a first key pair comprising a first private key and a first public key;

sending, from the electronic device to a user device, the first public key;

receiving, by the electronic device from the user device, a second public key;

generating, by the electronic device based on the first private key and the second public key, a shared key;

storing, by the electronic device, the shared key;

storing, by the electronic device, a transmission identifier generated based on the shared key;

sending, from the electronic device, a secure connection request message comprising the transmission identifier;

receiving, by the electronic device from a gateway device, a first response to the secure connection request message, the first response comprising the transmission identifier and first data;

decrypting, by the electronic device, the first data using the shared key to generate second data;

comparing, by the electronic device, the second data to a stored device identifier; and based on the comparing of the second data to the stored device identifier, sending, from the electronic device to the gateway device, third data.

2. The method of claim 1, wherein the user device comprises a cell phone, and wherein the method comprises:

sending, from the user device to a remote system, the first public key;

receiving, by the user device from the remote system, the second public key;

sending, from the gateway device to the remote system, a report message; and receiving, by the gateway device from the remote system, a challenge message comprising the first data.

3. The method of claim 1, wherein the secure connection request message comprises an advertising beacon utilizing a Bluetooth Low Energy scheme.

4. An electronic device comprising:

a sub-GHz wireless communication component;

a second wireless communication component;

one or more processors;

one or more computer readable media storing processor executable instructions which, when executed by the one or more processors, cause the electronic device to perform operations comprising generating a first key pair comprising a first private key and a first public key, sending, to a user device, the first public key, receiving, from the user device, a second public key, generating, based on the first private key and the second public key, a shared key, storing the shared key, storing a transmission identifier generated based on the shared key, sending a secure connection request message comprising the transmission identifier, receiving, from a gateway device, a first response to the secure connection request message, the first response comprising the transmission identifier and first data, decrypting the first data using the shared key to generate second data, comparing the second data to a stored device identifier, and based on the comparing of the second data to the stored device identifier, sending third data to the gateway device.

5. The electronic device of claim 4, wherein the electronic device comprises secure storage storing one or more elliptic keys.

6. The electronic device of claim 5, wherein the first key pair is generated based on the one or more elliptic keys.

7. The electronic device of claim 5, wherein the one or more computer readable media store processor executable instructions which, when executed by the one or more processors, cause the electronic device to perform operations comprising generating a first device identifier based on the one or more elliptic keys, and storing the first device identifier as the stored device identifier.

8. The electronic device of claim 4, wherein the one or more computer readable media store processor executable instructions which, when executed by the one or more processors, cause the electronic device to perform operations comprising encrypting fourth data as the third data.

9. The electronic device of claim 4, wherein the one or more computer readable media store processor executable instructions which, when executed by the one or more processors, cause the electronic device to perform operations comprising encrypting, using the shared key, fourth data as the third data.

10. The electronic device of claim 4, wherein the secure connection request message comprises an advertising beacon.

11. The electronic device of claim 4, wherein the sending of the secure connection request message utilizes a Bluetooth Low Energy (BLE) scheme.

12. The electronic device of claim 4, wherein the second wireless communication component is adapted to communicate utilizing a 2.4 GHz frequency band.

13. The electronic device of claim 4, wherein the one or more computer readable media store processor executable instructions which, when executed by the one or more processors, cause the electronic device to perform operations such that the sending of the first public key utilizes the second wireless communication component, and the receiving of the second public key utilizes the second wireless communication component.

14. The electronic device of claim 4, wherein the one or more computer readable media store processor executable instructions which, when executed by the one or more processors, cause the electronic device to perform operations comprising receiving, from the client device, fourth data, and decrypting the fourth data using the shared key; and wherein the storing of the shared key is based on the decrypting of the fourth data using the shared key.

15. The electronic device of claim 4, wherein the one or more computer readable media store processor executable instructions which, when executed by the one or more processors, cause the electronic device to perform operations such that the sending of the secure connection request message utilizes the second wireless communication component and a 2.4 GHz frequency band.

16. An electronic device comprising:

a sub-GHz wireless communication component;

a second wireless communication component;

one or more processors;

one or more computer readable media storing processor executable instructions which, when executed by the one or more processors, cause the electronic device to perform operations comprising storing a shared key, storing a transmission identifier generated based on the shared key, transmitting, using the second wireless communication component, a connection request beacon comprising the transmission identifier, receiving, from a gateway device, a first response to the secure connection request message, the first response comprising the transmission identifier and first data, decrypting the first data using the shared key to generate second data, comparing the second data to a stored device identifier, and based on the comparing of the second data to the stored device identifier, transmitting third data to the gateway device.

17. The electronic device of claim 16, wherein the one or more computer readable media store processor executable instructions which, when executed by the one or more processors, cause the electronic device to perform operations comprising encrypting, using the shared key, fourth data as the third data.

18. The electronic device of claim 16, wherein the second wireless communication component is adapted to communicate utilizing a 2.4 GHz frequency band.

19. The electronic device of claim 16, wherein the electronic device comprises a battery.

20. The electronic device of claim 16, wherein the electronic device comprises a global positioning system receiver.

* * * * *